C. BYRON & A. ARMSTRONG.
ORCHARD HEATER.
APPLICATION FILED SEPT. 2, 1913.
1,098,708.
Patented June 2, 1914.
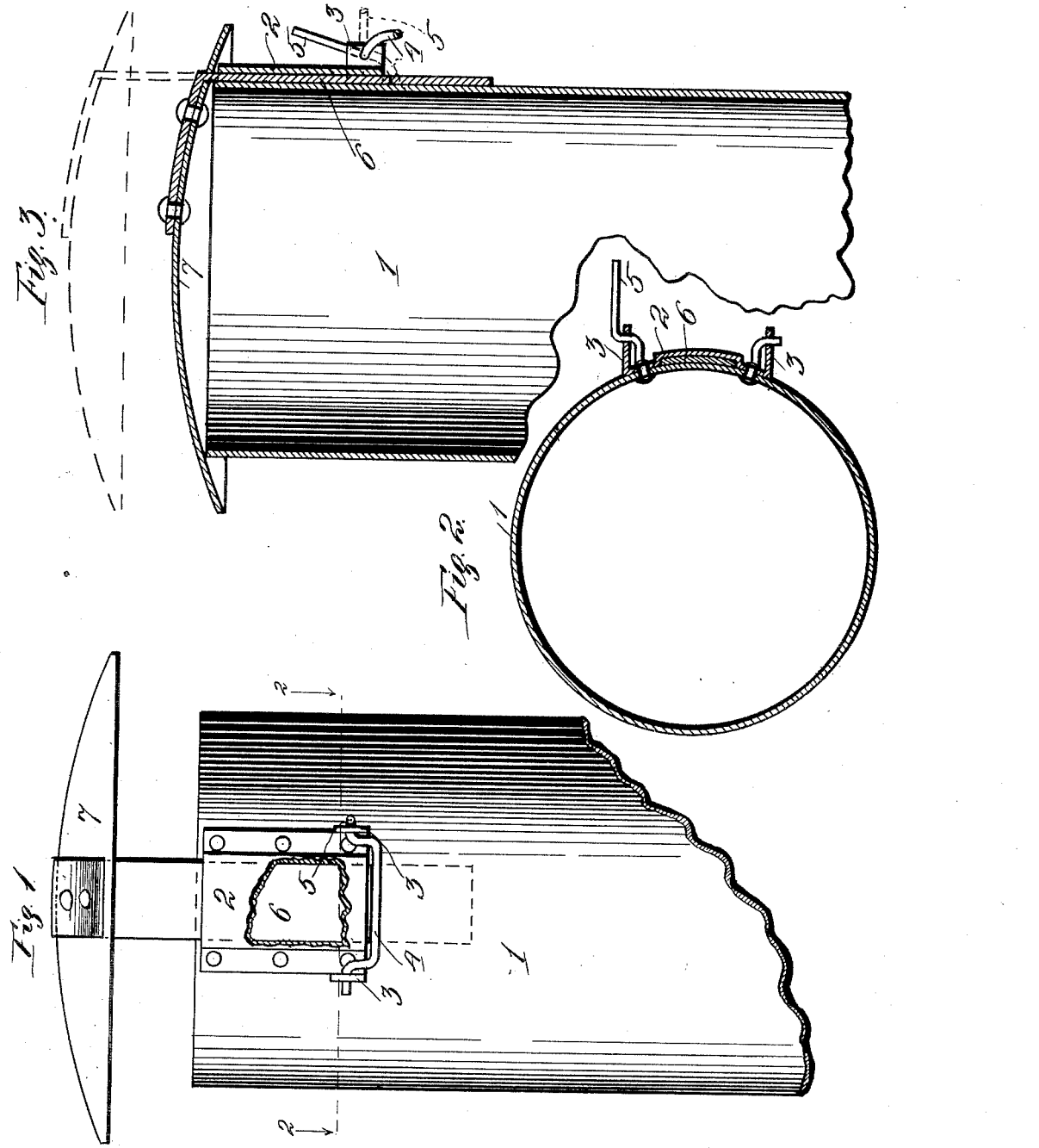

UNITED STATES PATENT OFFICE.

CLAYBORNE BYRON AND ANDREW ARMSTRONG, OF RIALTO, CALIFORNIA.

ORCHARD-HEATER.

1,098,708.  Specification of Letters Patent.  Patented June 2, 1914.

Application filed September 2, 1913. Serial No. 787,797.

*To all whom it may concern:*

Be it known that we, CLAYBORNE BYRON, a citizen of the United States, and ANDREW ARMSTRONG, a subject of Great Britain, both residing at Rialto, in the county of San Bernardino and State of California, have invented a certain new and useful Improvement in Orchard-Heaters, of which the following is a specification.

Our invention relates to an orchard heater, and has particular reference to a means for effectively and quickly extinguishing the fires in heaters of this type.

Objects of this invention are to provide a heater in which the cover therefor may be permanently attached thereto, whereby to prevent loss of the same and to keep out rain; to provide a cover which may be held in elevated position when the fires are burning therein, and to provide a means whereby the cover may be quickly released from elevated position to smother the fires in the pots.

With these and other objects in view this invention consists of the features, details of construction and combination of parts described in connection with the accompanying drawing and then more particularly pointed out in the claim.

In the drawing, Figure 1, is a front elevation showing the cover for the heater and the means for holding the same in elevated position. Fig. 2, is a transverse section on lines 2—2, Fig. 1, showing the means for holding the cover in elevated position and for releasing the same to allow it to drop to normal position, and Fig. 3, is a sectional elevation showing the cover in closed position, and the position of the cover holding means.

Referring to the drawing, 1, designates a pot or receptacle for a liquid fuel, having on one side a guide in the nature of a U-shaped plate 2, riveted to the pot and provided with ears 3. Pivotally mounted in said ears 3, is a preferably U-shaped support 4, having integral therewith a lever 5, to normally hold said support 4, in line with the bottom of said U-shaped plate 2, and to support an arm 6, which extends through said guide plate 2, and through a slot in the cover 7. Said arm 6, is bent upon itself at substantially right angles and the cover is riveted to said bent portion as shown. In the position shown in Fig. 1, the arm 6, is resting on the support 4, and the cover 7 is in elevated position or above the top of the pot. When it is desired to extinguish the fires in the heaters, the lever 5, is moved in the direction of the pot, occupying then substantially the position as shown in Fig. 3, which movement of the lever removes the support from the bottom of the arm. The arm and the cover attached thereto thereupon drops to the position shown in Fig. 3. When the cover 7, is raised to the position shown in Fig. 1, the lever 5, overbalancing the support 4, brings the latter in line, automatically, with the bottom of the arm, which is thereby held in the position to which it has been raised.

The cover 7, is dished as seen for the purpose of causing a downward deflection of the heat, whereby a greater area is heated than would be possible with no cover or one that is flat. Being of greater diameter than the pot, it prevents the rain from entering the pot and spoiling the fuel.

What we claim, is:—

An orchard heater comprising a receptacle for a liquid fuel, having on one side a guide plate provided with ears, an arm extending through said guide plate, a cover for said receptacle carried by said arm, and a support for said arm pivotally mounted in said ears to hold said arm and cover in elevated position, said support being provided with a lever to move same away from said arm, whereby to cause said arm and cover to drop.

In testimony whereof we have set our hands in the presence of two witnesses:

CLAYBORNE BYRON.
ANDREW ARMSTRONG.

Witnesses:
J. E. BLAIR,
F. E. EASTON.

---

Copies of this patent may be obtained for five cents each, by addressing the "Commissioner of Patents, Washington, D. C."